United States Patent
Monnier (10) Patent No.: US 8,739,227 B2
(45) Date of Patent: May 27, 2014

(54) RADIO SIGNAL DISTRUBUTION DEVICE AND RECEPTION SYSTEM THEREFOR

(75) Inventor: Raoul Monnier, Noyal s/Vilaine (FR)

(73) Assignee: Thomson Licensing, Boulogne-Billancourt (FR)

( * ) Notice: Subject to any disclaimer, the term of this patent is extended or adjusted under 35 U.S.C. 154(b) by 1417 days.

(21) Appl. No.: 10/531,742

(22) PCT Filed: Oct. 21, 2003

(86) PCT No.: PCT/FR03/03106
§ 371 (c)(1),
(2), (4) Date: Oct. 26, 2005

(87) PCT Pub. No.: WO2004/038965
PCT Pub. Date: May 6, 2004

(65) Prior Publication Data
US 2006/0195871 A1    Aug. 31, 2006

(30) Foreign Application Priority Data
Oct. 23, 2002  (FR) ..................................... 02 13460
Feb. 20, 2003  (WO) ....................... PCT/FR03/00572

(51) Int. Cl.
*H04N 7/20*    (2006.01)

(52) U.S. Cl.
USPC ................................. 725/63; 725/71; 725/78

(58) Field of Classification Search
USPC ........................ 725/63, 74, 78, 129
See application file for complete search history.

(56) References Cited

U.S. PATENT DOCUMENTS

| | | | | |
|---|---|---|---|---|
| 4,802,239 A * | 1/1989 | Ooto | ........................ | 455/150.1 |
| 5,276,904 A * | 1/1994 | Mutzig et al. | ................... | 725/68 |
| 5,345,591 A * | 9/1994 | Tsurumaki et al. | ............. | 725/69 |
| 5,905,940 A * | 5/1999 | Arvisais | ........................... | 725/1 |
| 5,940,737 A * | 8/1999 | Eastman | ......................... | 725/68 |
| 6,075,970 A * | 6/2000 | Van Amesfoort | ............. | 455/3.02 |
| 6,088,569 A * | 7/2000 | Bach et al. | ..................... | 725/149 |
| 6,344,832 B1* | 2/2002 | Lotfy | ............................ | 343/786 |
| 6,622,304 B1* | 9/2003 | Carhart | ........................... | 725/74 |
| 6,728,513 B1* | 4/2004 | Nishina | ........................ | 455/3.02 |
| 7,308,230 B2* | 12/2007 | Godwin | ........................ | 455/3.02 |
| 2003/0025841 A1* | 2/2003 | Sawyer | ........................ | 348/734 |
| 2004/0064511 A1* | 4/2004 | Abdel-Aziz et al. | .......... | 709/206 |

FOREIGN PATENT DOCUMENTS

| | | | | |
|---|---|---|---|---|
| CN | 1262581 | 8/2000 | | |
| EP | 1024613 | 8/2000 | | |
| EP | 1024613 | * 11/2000 | ............... | H04H 1/00 |
| WO | WO-02/065780 | * 8/2002 | ............... | H04N 7/20 |
| WO | WO 02/065780 | 8/2002 | | |

OTHER PUBLICATIONS

Search Report Dated March 29, 2004.

* cited by examiner

*Primary Examiner* — Nnenna Ekpo
(74) *Attorney, Agent, or Firm* — Tutunjian & Bitetto, P.C.

(57) ABSTRACT

Data is exchanged between two decoders by means of an antenna cable while, at the same time, being able to position at least two decoders in two different transmission bands or on two independent antennas. A signal distribution device in a multi-decoder reception system has means, such as a band pass filter, for linking the input/outputs, connected to the decoders, between them in order to form an electrical contact limited to a communication frequency band.

6 Claims, 7 Drawing Sheets

RADIO SIGNAL DISTRUBUTION DEVICE AND RECEPTION SYSTEM THEREFOR

This application claims the benefit, under 35 U.S.C. §365 of International Application PCT/FR03/03106, filed Oct. 21, 2003, which was published in accordance with PCT Article 21(2) on May 6, 2004 in French and which claims the benefit of French patent application No. 02/13460, filed Oct. 23, 2002 and PCT patent application No. PCT/FR03/00572, filed Feb. 20, 2003.

FIELD OF THE INVENTION

The invention relates to a radio signal distribution device, notably of the LNB (Low Noise Block), distributor, switches or simple coupling device type. The invention also relates to a satellite reception system including the device.

BACKGROUND ART

For television program reception via satellite, a known configuration is to use a reception antenna composed of a parabolic reflector and of a source, a frequency-conversion unit transforming the signals received by the horn into electrical signals in an intermediate band, and a decoder that transforms the electrical signals into data or signals that are usable by a user appliance.

As regards satellite transmission, the transmission frequency band may turn out to be wider than the intermediate frequency band. In addition, a known method is to make use of horizontally and vertically polarized waves in order to double the capacity of the frequency band. Conversion units effect the choice of polarization and of band selection (high band or low band) during the intermediate frequency transposition.

A problem arises when several decoders are connected to the same conversion unit. All the decoders must position themselves in the same band which then renders the simultaneous display of two programs placed in different bands incompatible. Furthermore, the arrangement of one antenna per decoder is costly and not very aesthetic.

Figure 1:
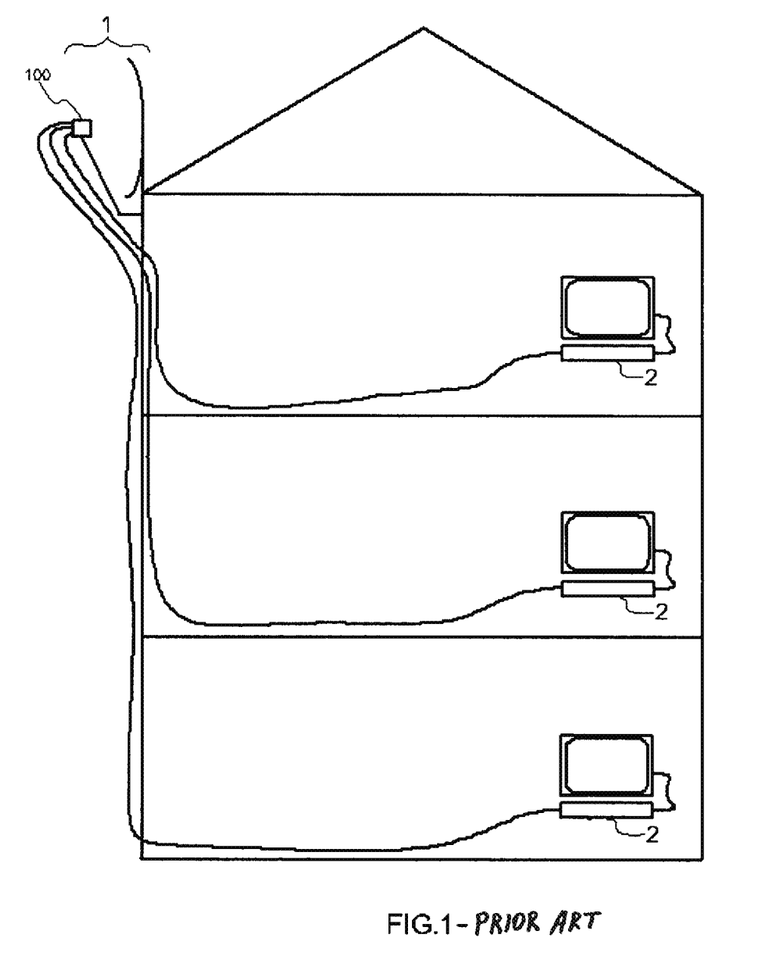
FIG. 1 shows a satellite reception system using two or more decoders.
Figure 2:
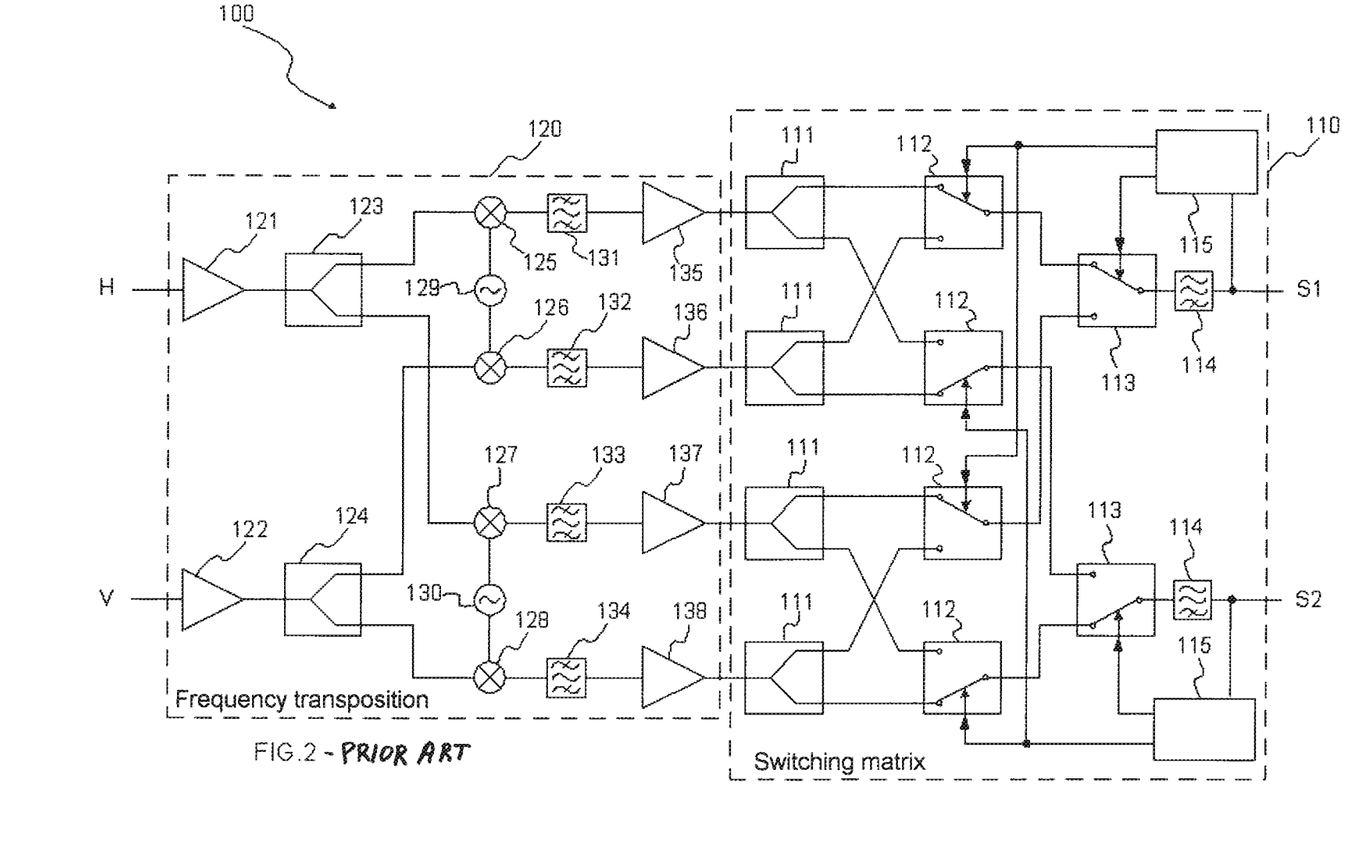
FIGS. 2 and 3 show multiple-output conversion units according to the prior art.
Figure 3:
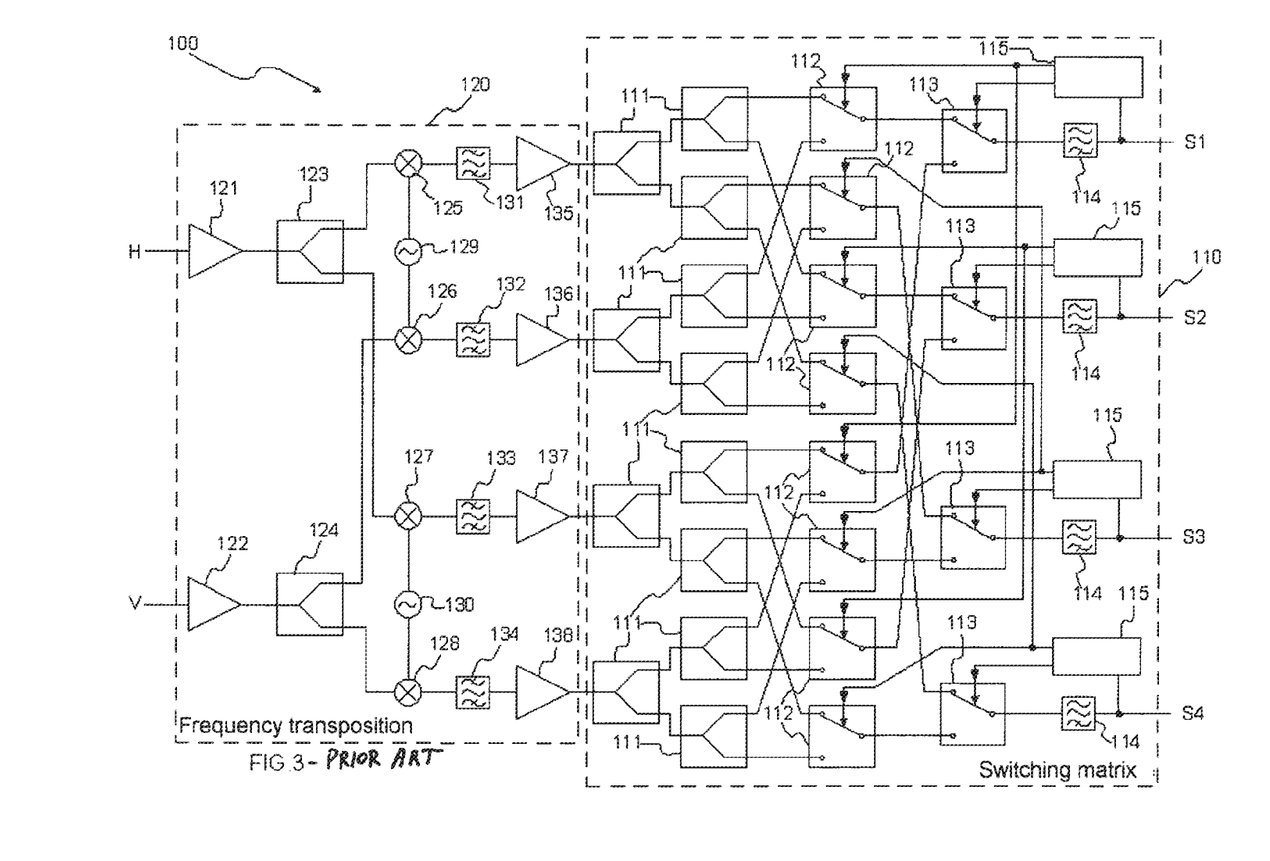

A known solution, shown in FIG. 1, consists in using a single antenna 1 with a multiple-output conversion unit 100. Thus, each decoder 2 from the same home can be independently connected to the conversion unit 100 while, at the same time, selecting the desired band and polarization for the user appliance 3 with which it is associated. Multiple-output conversion units 100 are often units having 2 or 4 outputs as shown in FIG. 2 or 3.

Currently, satellite television operators would like to have a service they can offer for their clients who wish to have two or more decoders with a reduced price per unit from the second decoder onward. In order to avoid a decoder offered at a reduced price being used in another installation, the system is designed to have one main decoder in the installation and secondary decoders that will only operate if they are in the same installation as the main decoder. In order to verify the presence of the main decoder, an exchange of keys between the two decoders can be used. In order to avoid having to add an additional connection between the decoders, the coaxial cable that connects a decoder to the antenna can be used. However, that requires having a secondary decoder connected to the same antenna cable as the main decoder, which in turn requires having all the decoders positioned in the same transmission band. Indeed, it is not possible to make use of a multiple-output conversion unit 100, since, if the switching matrix 110 is positioned in different bands for two different outputs, then there is total isolation between the coaxial cables corresponding to two different decoders, as can be seen in FIGS. 2 and 3.

A similar problem is encountered when it is desired to use a common satellite antenna connected to two or more decoders and to use a return channel. A single decoder can use the return channel at the same time; it is therefore necessary to make the decoders communicate with each other in order to determine which one is using the return channel. The antenna cable can also be used for exchanging synchronization information.

The same problems also arise when two or more decoders are used jointly with one or more antennas. We are then faced with a distribution network that incorporates one or more distributor(s), switch(es) or other coupling device. The antenna cables of the decoders can then be completely independent from each other.

SUMMARY OF THE INVENTION

The invention proposes a solution that allows, on the one hand, data to be exchanged between at least two decoders via the antenna cable and, on the other, the signals received and/or transmitted by the decoders to be rendered independent. The invention proposes that a coupling device be added between the coaxial cables of an installation having at least two decoders. The coupling device comprises means for linking the input/outputs connected to the decoders in order to create an electrical contact limited to a communication frequency band.

Thus, a subject of the invention is a radio signal distribution device comprising at least two first signal input/outputs to be connected to decoders, characterized in that it comprises at least one means of communication linking the input/outputs between them within a communication frequency band.

Preferably, the communication means is a bandpass filter whose bandwidth corresponds to the communication frequency band.

According to one embodiment, the device is a coupling device that also comprises at least two second signal input/outputs to be connected to two independent reception devices, each second input/output being connected to a first input/output via a filter that rejects the communication frequency band.

According to another embodiment, the device is a source switching device that also comprises at least two second signal input/outputs to be connected to two independent reception devices, and switching means allowing each of the first input/outputs to be connected to each of the second input/outputs depending on a selection signal, said selection means being equipped with means for suppressing the communication frequency band.

According to another embodiment, the device is a unit for converting radio waves into an electrical signal that also comprises at least two transposition means for transforming a transmission frequency band into at least two intermediate frequency bands, at least two selection means allowing each of the first input/outputs to be connected to each of the transposition means. According to various embodiments, the transmission frequency band is separated into at least two intermediate frequency bands corresponding to two different wave polarizations. The transmission frequency band is separated into at least two intermediate frequency bands corresponding to the same wave polarization, but whose bandwidth is substantially twice as narrow. The unit comprises four input/outputs and at least three communication means.

Another subject of the invention is a satellite program reception system comprising at least two electrical signal sources corresponding to radio waves, said sources having at least two input/outputs and at least two decoders each connected to one of the input/outputs of said unit by means of two distinct coaxial cables. The two decoders exchange data between them via the coaxial cables and at least one coupling device or one switching device such as was previously defined, and whose first input/outputs are connected to the decoders and whose second input/outputs are connected to the sources.

Another subject of the invention is also a satellite program reception system comprising at least one unit for converting radio waves into an electrical signal, said unit having at least two input/outputs and at least two decoders each connected to one of the input/outputs of said unit by means of two distinct coaxial cables. The two decoders exchange data between them via the coaxial cables and said unit is a device such as was previously defined.

BRIEF DESCRIPTION OF THE DRAWINGS

The invention will be better understood, and other features and advantages will become apparent upon reading the description that follows which makes reference to the appended drawings, in which.

In the present description, the same references are used to denote the same elements or similar elements.

A first embodiment of the invention is a multiple-output LNB 100. The multiple-output conversion units 100 in FIGS. 2 to 5 comprise two parts, a first part 120 carrying out the transposition of the signal of the transmission band into an intermediate frequency band and a second part 110 effecting the selection of the transposed band to be sent to the decoder.

The first part 120 comprises two inputs H and V which correspond to the signals coming from two probes that transform the waves received with a Horizontal polarization and a Vertical polarization, respectively, into electrical signals. In Europe, the bands of frequencies received for each of these polarizations are in the range from 10.7 to 12.75 GHz. The intermediate satellite band is in the range from 950 to 2150 MHz which requires the transmission band to be divided into two.

First low-noise amplifiers 121 and 122 amplify the signals from the frequency band received for each polarization. The output signal from each amplifier 121 and 122 is split into two by means of power dividers 123 and 124. Four mixers 125, 126, 127 and 128 multiply the signals coming from the power dividers 123 and 124 by a signal coming from one of the two local oscillators 129 and 130. The local oscillators 129 and 130 deliver sinusoidal signals with frequencies, for example, respectively equal to 9.75 GHz and 10.6 GHz. Bandpass filters 131, 132, 133 and 134 placed at the outputs of the mixers 125, 126, 127 and 128 select the portion of transposed band that is situated inside the intermediate satellite band. By way of example, the filters 131 and 132, associated with the oscillator 129, admit a band of frequencies in the range from 950 to 1950 MHz which corresponds to the low transmission band, and the filters 133 and 134, associated with the oscillator 130, admit a band of frequencies in the range from 1100 to 2150 MHz which corresponds to the high transmission band. Second low-noise amplifiers 135, 136, 137 and 138 are placed after the filters 131, 132, 133 and 134, respectively, in order to amplify the signals in intermediate frequency bands prior to delivering them to the switching matrix 110.

The switching matrix 110 performs the selection for each input/output S1, S2, S3 and S4 of the conversion unit 100 from the desired intermediate band. The switching matrices 110 in FIGS. 2 and 4 have two input/outputs S1 and S2, whereas the switching matrices 110 in FIGS. 3 and 5 have four input/outputs S1, S2, S3 and S4. However, although slightly different, the switching matrices 110 comprise the same elements. Power dividers 111 are connected to the outputs of the second amplifiers 135 to 138 in order to multiply the number of lines carrying the signals output from said amplifiers 135 to 138, such that there are as many lines as exist input/outputs S1, S2, S3 and S4. First controlled switches 112 are connected to the lines exiting from the power dividers 111 such that each first switch 112 selects the polarization for the same transmission frequency band (low or high). Second controlled switches 113 are connected to the outputs of the first switches 112 such that each second switch 113 is connected to two first switches 112 that correspond to two different transmission frequency bands. The output of each second switch 113 is connected to one of the input/outputs S1, S2, S3 or S4 via a high-pass filter 114 that behaves as an open circuit for low-frequency signals which are used, on the one hand, for controlling the first and second switches 112 and 113 and, on the other, for supplying the active circuits of the unit 100.

Control circuits 115 are connected to each input/output in order to detect control signals, for example conforming to the standard DiSEqC, and to control the first and second switches 112 and 113 associated with said input/output.

DESCRIPTION OF PREFERRED EMBODIMENTS

Figure 4:
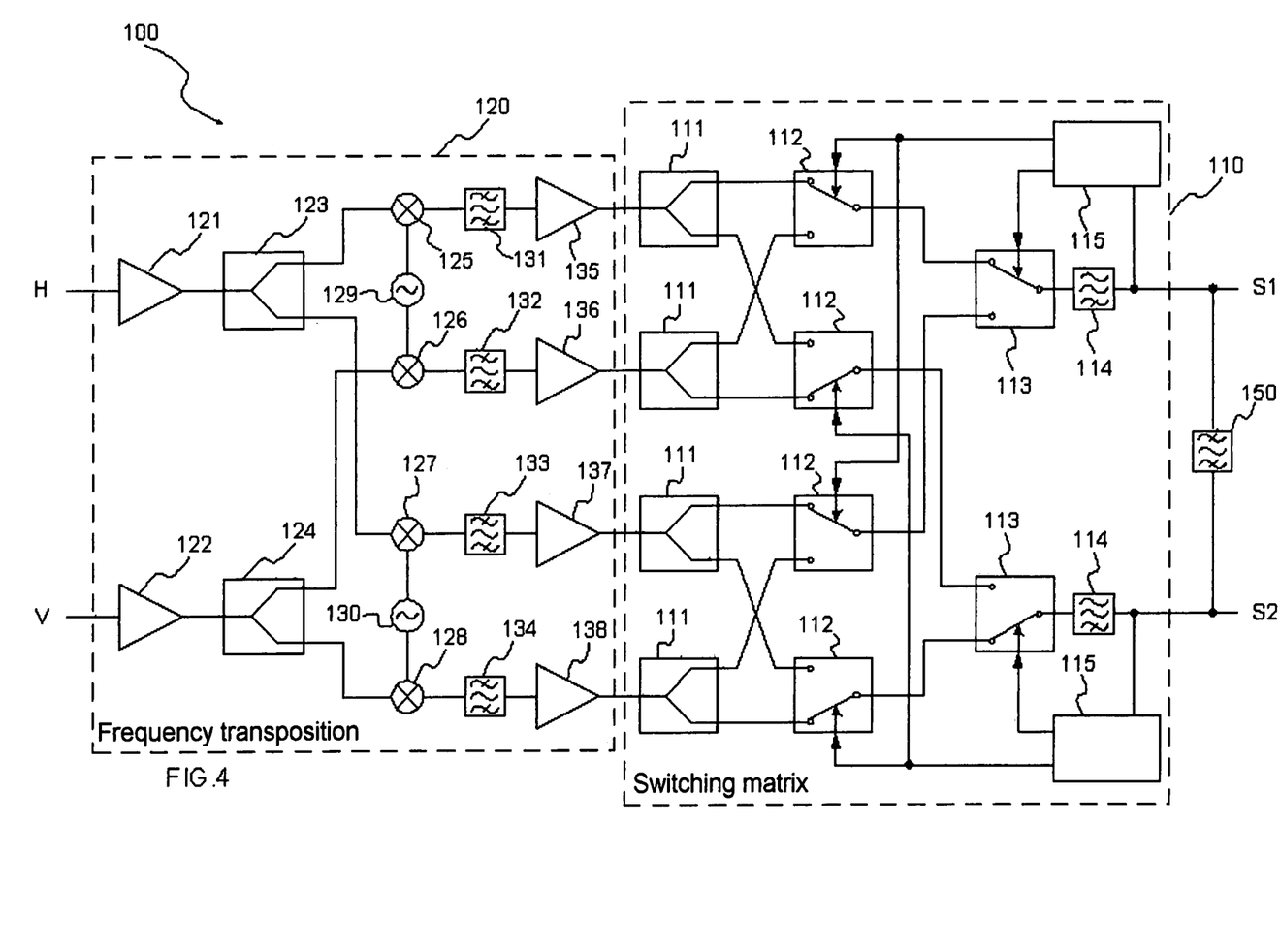
FIGS. 4 and 5 show multiple-output conversion units according to the invention.
Figure 5:
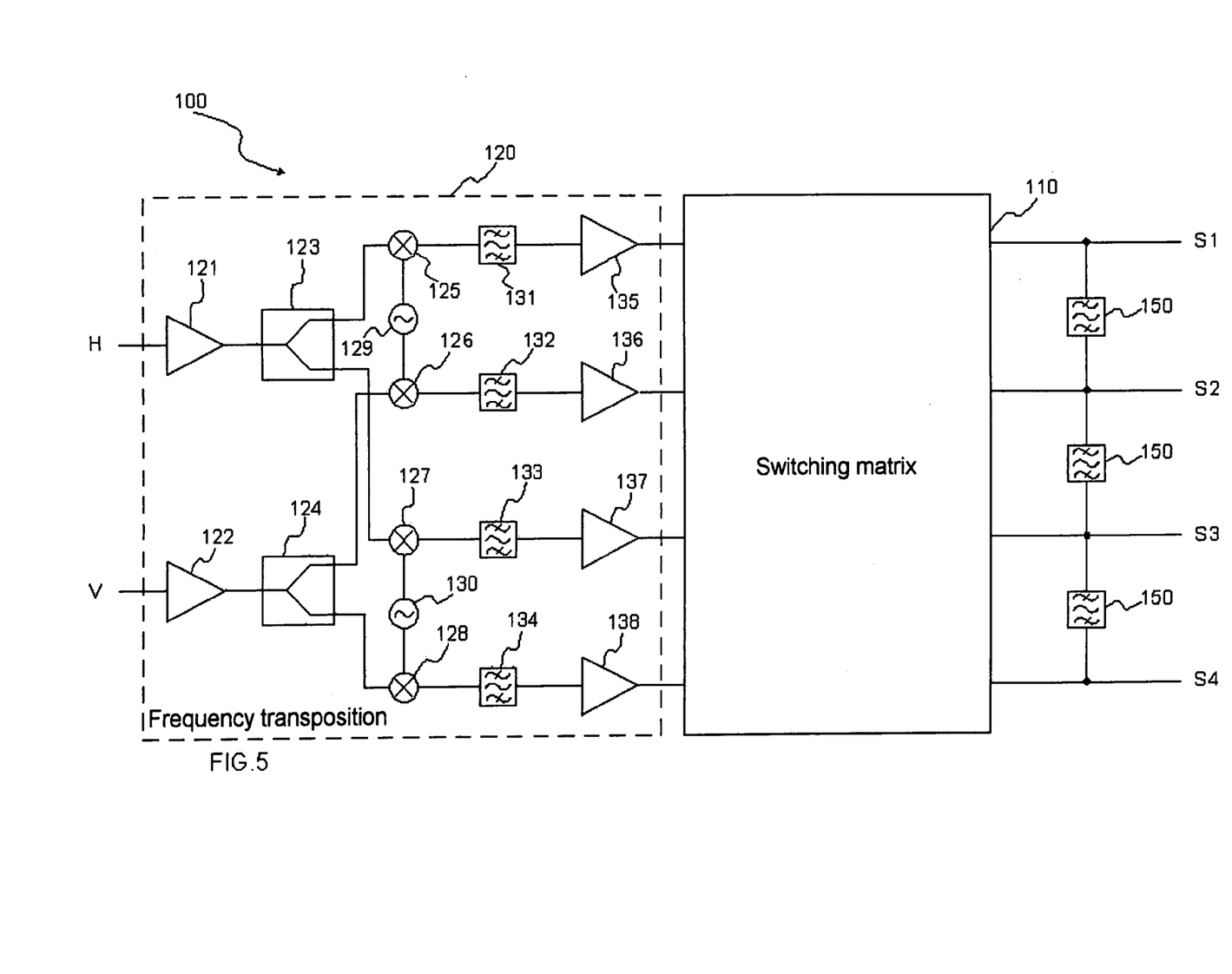

The circuit diagrams in FIGS. 4 and 5 reveal communication means 150 placed between the input/outputs. The role of the communication means is to allow a band of frequencies corresponding to a communication channel between decoders to pass between the input/outputs S1, S2, S3 and S4, while preventing the frequencies that correspond to the intermediate bands or to the control signals from passing. Preferably, the communication means 150 are formed by means of bandpass filters whose bandwidth corresponds to the communication channel between the decoders.

The choice of the communication channel between the decoders can be made by choosing a band of frequencies of the ISM (Industrial, Scientific and Medical) type that corresponds to a widely-used band of frequencies for which there are many commercially available circuits. By way of example, a communication frequency band of 10 kHz width centered on 433 MHz may be used.

The choice of the communication channel can also be made with the aim of reducing the filtering constraints as long as there is no overlap with reserved frequency bands. By way of example, it is possible to have a communication band centered at 1 MHz and, in order to keep the system simple, a modulation of the 'all-or-nothing' type is used, for example, where the 'zeros' are encoded by the absence of the 1 MHz carrier and the 'ones' by the presence of the 1 MHz carrier.

Figure 6:
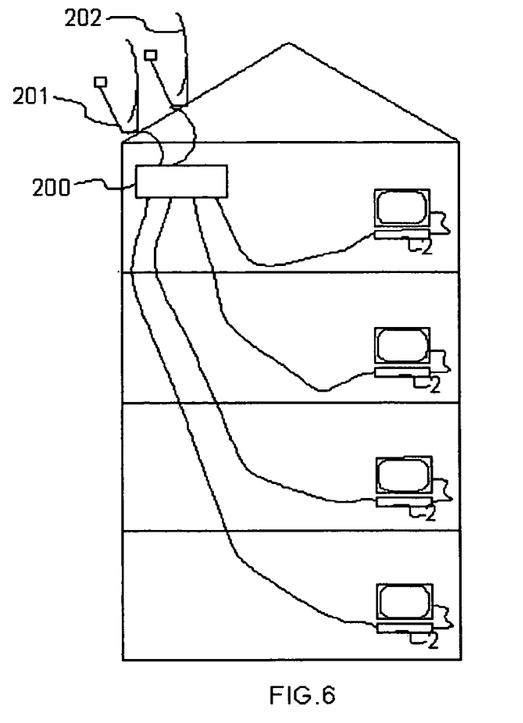
FIGS. 6 to 9 illustrate other embodiments.
Figure 7:
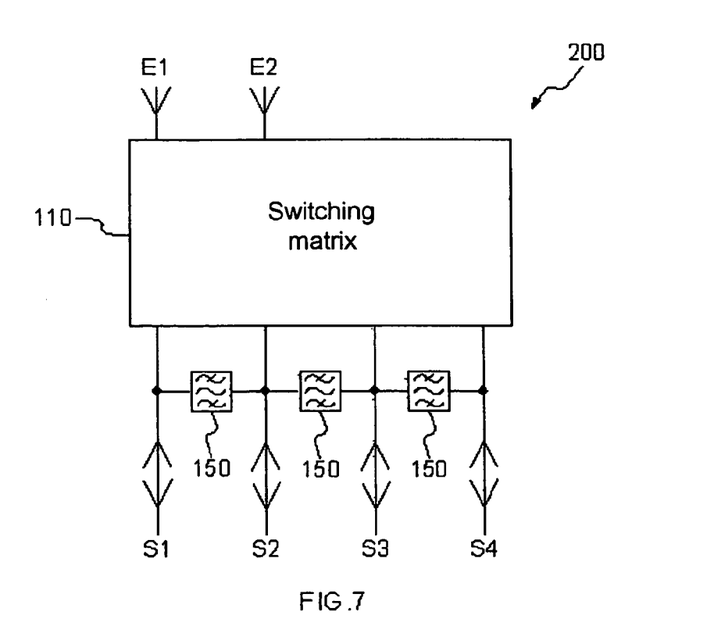

A second embodiment is described in conjunction with FIGS. 6 and 7. The distribution network in FIG. 6 comprises a plurality of decoders 2 connected to a switching device 200 in an installation comprising two individual antennas 201 and 202. The switching device 200 comprises a switching matrix 110 of a type similar to that described in FIG. 3. The switching matrix comprises two signal input/outputs E1 and E2 respectively coupled to each of the antennas 201 and 202 and four signal input/outputs S1 to S4 respectively coupled to each of the decoders 2. The bandpass filters 150 are placed in between the input/outputs S1 to S4 in order to only allow the communication channel to pass. The switching matrix 110 is, of course, equipped with high-pass filters 114, shown in FIG. 3, in order to suppress the communication channel and the switching signals coming from the decoders 2.

Figure 8:
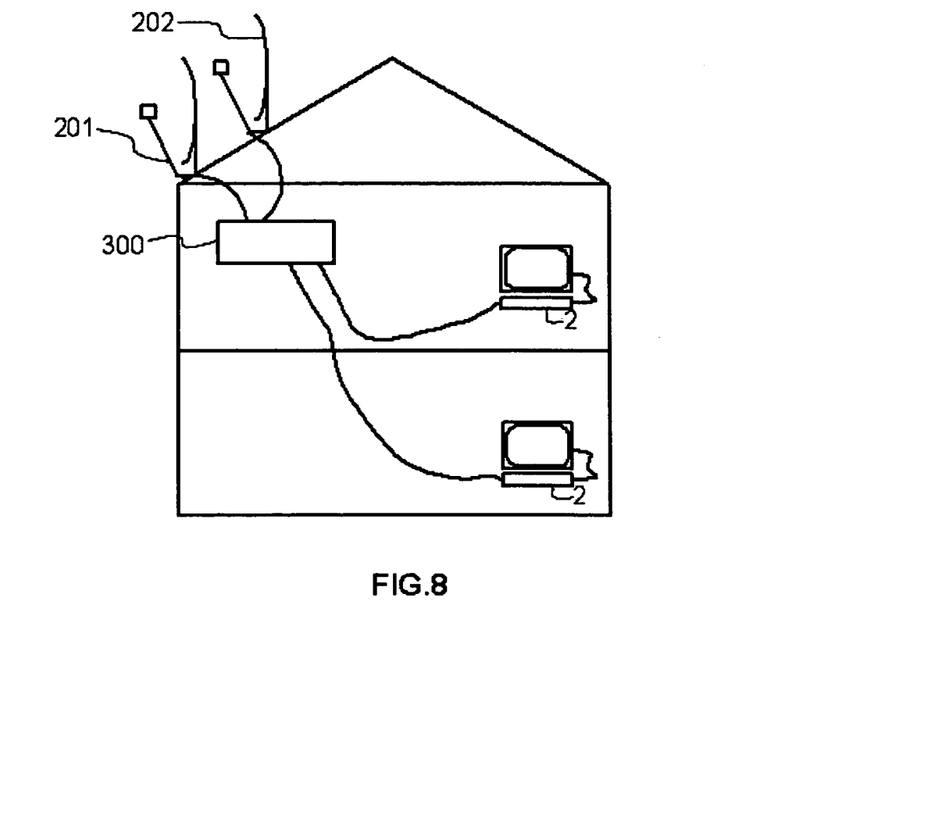

Another embodiment, illustrated in FIG. 8, consists in using a simple coupling device in a distribution network. The installation comprises two independent antennas 201 and 202 each connected to a decoder 2 by means of a coupling device 300.

The coupling device 300 comprises two first signal input/outputs E/S3 and E/S4 to be connected to the decoders 2 and two second input/outputs E/S1 and E/S2 to be connected to the LNB of the antennas 201 and 202, respectively. A bandpass filter 150 links the first signal input/outputs E/S3 and E/S4 in order to establish the communication between the decoders 2. The second input/outputs E/S1 and E/S2 are respectively connected to the first signal input/outputs E/S3 and E/S4 via band-rejection filters 301 and 302 that reject the frequency band corresponding to the communication channel used by the decoders 2.

Such a coupling device can be extended to N first and N second input/outputs. For each addition of an input/output pair, a bandpass filter 150 and a band-rejection filter 303 are added, as is shown in dotted lines.

Figure 9:
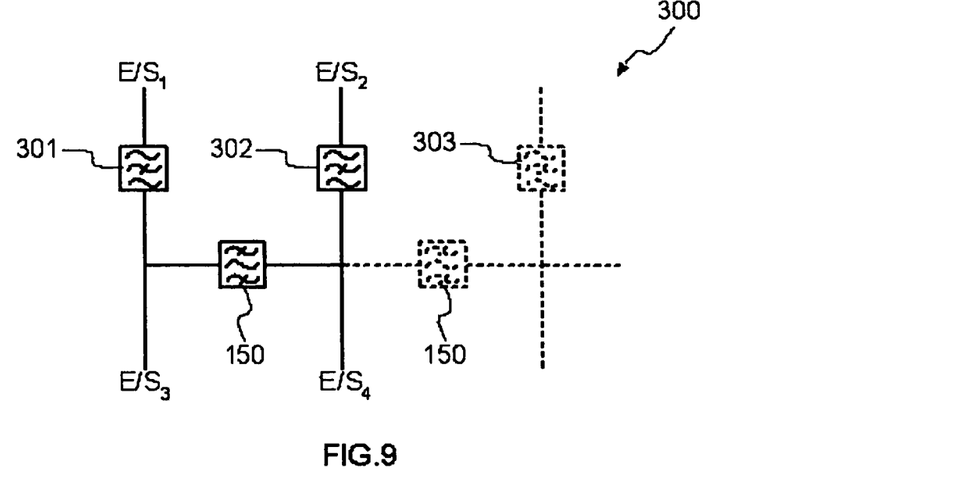

The invention can be extended to any device or device combination included within the satellite reception system at the home of the user when this system comprises a plurality of decoders requiring a means of communication between them. The device will then need to comprise filters 150 between the input/outputs connected to the decoders 2. If the devices do not have a filtering means rejecting the frequency band used for communicating between the decoders 2, it will also be necessary to equip them with rejection filters, as indicated, for the coupling device. One way to achieve this is to add the equivalent of a coupling device 300, such as is shown in FIG. 9, at the input of a device in the system.

Thus, the invention can be integrated with, amongst other systems, multiple-output antenna amplifiers, multiple-output satellite/satellite couplers, multiple-output satellite/ground couplers, distributors, antenna switches, and with any other collective distribution system element.

The invention claimed is:

1. A multiple output conversion unit for distribution of program signals carried in radio signals, comprising:
   a transposition part carrying out the transposition of the radio signals to at least two different intermediate frequency bands;
   a selecting part effecting the selection of the transposed radio signals such that each transposed radio signal can be sent through its specific output to a decoder in its specific intermediate frequency band, said selection being responsive to control signals;
   a communicating part allowing exchange of data signals between said different decoders in a communication frequency band via said outputs, comprising:
   filter means linking said outputs and that are adapted to allow said data signals to pass between said decoders through said outputs in said communication frequency band while preventing passage therebetween of said control signals and said transposed radio signals in said intermediate frequency bands.

2. The multiple output conversion unit as claimed in claim 1, wherein the filter means is a bandpass filter whose bandwidth corresponds to the communication frequency band.

3. The multiple output conversion unit as claimed in claim 2, wherein the selecting part comprises:
   switching means and filters for suppressing the communication frequency band.

4. A satellite program reception system comprising:
   means for receiving at least two electrical signals,
   a frequency transposition means for transposing said electrical signals into at least two different intermediate frequency bands;
   a switching matrix having at least two outputs, for performing selection of the transposed signals using control signals such that each transposed radio signal can be sent through to its specific output to a decoder in its specific intermediate frequency band;
   at least two decoders each connected to one of the outputs of said switching matrix by means of two distinct coaxial cables, said decoders exchanging data in a communication frequency band; and
   filter means linking said outputs adapted to allow data signals in said communication frequency band to pass between said decoders while preventing passage of said control signals and transposed radio signals in said intermediate frequency bands.

5. The multiple output conversion unit as claimed in claim 1, wherein the at least two intermediate frequency bands correspond to two different wave polarizations in the radio signals.

6. The multiple output conversion unit as claimed in claim 1, wherein the radio signals are transposed to two intermediate frequency bands corresponding to components of the radio signals having substantially half the bandwidth of the radio signals.

* * * * *